United States Patent [19]

Crivello et al.

[11] 4,423,136
[45] Dec. 27, 1983

[54] FREE RADICAL CURABLE RESIN COMPOSITIONS CONTAINING TRIARYLSULFONIUM SALT

[75] Inventors: James V. Crivello, Elnora; James E. Moore, Clifton Park, both of N.Y.

[73] Assignee: General Electric Company, Schenectady, N.Y.

[21] Appl. No.: 330,428

[22] Filed: Dec. 14, 1981

Related U.S. Application Data

[63] Continuation of Ser. No. 151,390, May 19, 1980, abandoned, which is a continuation of Ser. No. 31,508, Apr. 17, 1979, abandoned, which is a continuation of Ser. No. 822,220, Aug. 15, 1977, abandoned.

[51] Int. Cl.$^3$ ............................................. G03C 1/68
[52] U.S. Cl. .................................... 430/281; 430/285; 430/286; 204/159.18; 204/159.22; 204/159.24
[58] Field of Search ...................... 204/159.18, 159.22, 204/159.24; 430/280, 281, 278, 285, 286

[56] References Cited

U.S. PATENT DOCUMENTS 4,058,400 11/1977 Crivello ............................ 430/280
4,058,401 11/1977 Crivello ............................ 430/280
4,069,054 1/1978 Smith ................................ 430/280

OTHER PUBLICATIONS

Kunieda et al., Polymer Letters Edition vol. 12, pp. 395-297 (1974).

*Primary Examiner*—Jack P. Brammer
*Attorney, Agent, or Firm*—William A. Teoli; James C. Davis, Jr.; James Magee, Jr.

[57] ABSTRACT

Photocurable compositions are provided based on the use of a triarylsulfonium salt photoinitiator to effect the free-radical cure of particular organic resins, such as an acrylic. A free-radical curing method is also provided for a broad variety of aliphatically unsaturated materials including mixtures of styrene and unsaturated polyesters.

3 Claims, No Drawings

FREE RADICAL CURABLE RESIN COMPOSITIONS CONTAINING TRIARYLSULFONIUM SALT

This application is a continuation of copending application Ser. No. 151,390, filed May 19, 1980, now abandoned which is a continuation of application Ser. No. 31,508, filed Apr. 19, 1979, now abandoned, which is a continuation of application Ser. No. 822,220, filed Aug. 5, 1977, now abandoned.

The present invention relates to UV curable compositions and a method of curing based on the generation of free-radicals. More particularly, the present invention relates to the use of a triarylsulfonium photoinitiator to effect the free-radical cure of acrylic resins and certain unsaturated polyester mixtures.

Prior to the present invention, as taught by Passalenti et al, U.S. Pat. No. 3,616,366 and U.S. Pat. No. 3,627,657, free-radical photocurable mixtures such as unsaturated polyesters had to be stabilized with materials, such as arylphosphites when using photoinitiators such as benzoin and its derivatives. It has been found, for example, that unless a stabilizer is employed in such photocurable resin mixtures that the shelf life of such materials is often less than 6 weeks under atmospheric conditions. However, even with stabilizers, free-radical photocuring organic resins often have shelf lives of less than 6-12 months at ambient temperatures. As shown by Abrams et al, U.S. Pat. No. 3,028,361, sulfonium salts can be used as a stabilizer for polyester compositions which are thermally cured with a peroxide catalyst.

Improved shelf stability has been found for free-radical photocuring organic resin mixtures, as shown in Smith U.S. Pat. Nos. 3,729,313 and 3,808,006, when a complex catalyst system is used. For example, Smith teaches that a diaryliodonium compound can be used as photoinitiators in combination with a sensitizing organic dye, such as acridine and a photolyzable organic halogen compound, such as 2-methyl-4,6-bis(trichloromethyl)-s-triazine. It would be desirable therefore to effect the free-radical cure of various resins such as acrylics and mixtures of aliphatically unsaturated polyesters and vinyl aromatic organic compounds by employing a photoinitiator which does not require the presence of a stabilizer or does not require the use of a combination of additional ingredients, such as the aforementioned organic dye and substituted triazine shown in the aforesaid patents of Smith, while at the same time possess a superior shelf life, such as greater than 6 months at ambient temperatures.

The present invention is based on the discovery that triarylsulfonium salts having the formula, $$[(R)_3S]^+[Y]^-, \tag{1}$$

where R can be a monovalent $C_{(6-13)}$ aromatic radical and Y is an anion, can be used as a photoinitiator to effect the photocure of free-radical curable organic resins such as thiolene resins, or acrylic resins, mixtures of aliphatically unsaturated polyesters with vinyl aromatic compounds, etc., in a relatively short period of time, such as an exposure of from 0.5–1 minute or less to ultraviolet light. In addition, it has been found that such photocurable organic resin mixtures possess superior shelf life for a period exceeding 6 months at ambient temperatures in the absence of a phenolic or quinonic inhibitor.

As taught in copending application RD-10108 of James V. Crivello, filed concurrently herewith ahd assigned to the same assignee as the present invention, Y of formula (1) can be an $M(Q)_d$ radical, where M is a metal or metalloid, and Q is a halogen radical and a has a value such as 4–6, for example $AsF_6$. If such $M(Q)_d$ triarylsulfonium salt is used in combination with a free-radical cureable organic resin, such as an acrylic, or an aliphatically unsaturated polyester having cationic curing sites such as oxirane oxygen, either in the form of a mixture with an organic compound, such as epoxy monomer, for example, an epoxy acrylate, or as a chemically combined unit, for example, an oxirane unit in the backbone of the unsaturated polyester and such photocurable mixture is irradiated, a simultaneous free-radical and cationic cure of the organic resin can be achieved.

There is provided by the present invention, photocurable organic resin compositions comprising, (A) a free radical curable organic resin free of oxirane oxygen selected from the class consisting of acrylic resins, and thiol-ene resins, and (b) from 0.1 to 15% by weight of (A) and (B) of triarylsulfonium salt of formula (1).

Additional photocurable compositions provided by the present invention comprise (C) free-radical curable organic resins having chemically combined oxirane oxygen of the formula,

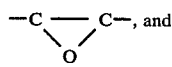, and

, and (D) from 0.1 to 15% by weight of (C) and (D) of a triarylsulfonium salt of the formula, $$[(R)_3S]^+[X]^-, \tag{2}$$

where R is as previously defined and X is an anion selected from halogen, $NO_3$, $HSO_4$, and $H_2PO_4$.

Radicals included by R of formulas 1–2 are, for example, $C_{(6-13)}$ aromatic hydrocarbon radicals such as phenyl, tolyl, naphthyl, anthryl and such radicals substituted with up to 1 to 4 monovalent radicals such as $C_{(1-8)}$ alkyl, nitro, chloro, hydroxy, etc.; aromatic heterocyclic radicals such as pyridyl, furfuryl, etc. Anions included by Y of formula (1) are, for example, halogen, for example, chlorine, bromine, fluorine and iodine: $NO_2$, $HSO_3$, $ClO_4^-$, etc; $MQ_d$, such as $BF_4^-$, $PF_6^-$, $AsF_6^-$ $SbF_6^-$, $FeCl_4^=$, $SnCl^-$, $SbCl_6^-$, $BiCl_5^-$, $AlF_6^-$, $GaCl_4^-$, $InF_4^-$, $TiF_6^-$, $ZrF_6^-$, etc. Additional metals included by M are, for example, transition metals such as Zr, Sc, V, Cr, Mn, Cs, etc; rare earth elements such as the lanthanides, for example Ce, Pr, Nd, etc., actinides, such as Th, Pa, U, Np, etc., and metalloids such as B, P, As, etc.

Triphenylsulfonium salts included in formulas (1) and (2) can be made by procedures shown in J. W. Knapczyk and W. E. McEwen, J. Am. Chem. Soc., 90 145, (1969); A. L. Maycock and G. A. Berchtold, J. Or. Chem. Soc. 35, No. 8, 2532 (1970); H. M. Pitt, U.S. Pat. No. 2,807,648, E. Goethals and P. DeRAdzetzky, Bul. Soc. Chim. Belg., 73 546 (1964); H. M. Leicester and F.W. Bergstrom, J. Am. Chem. Soc., 51 3587 (1929), etc.

Some of the triphenylsulfonium salts included in formula (1) are, for example,

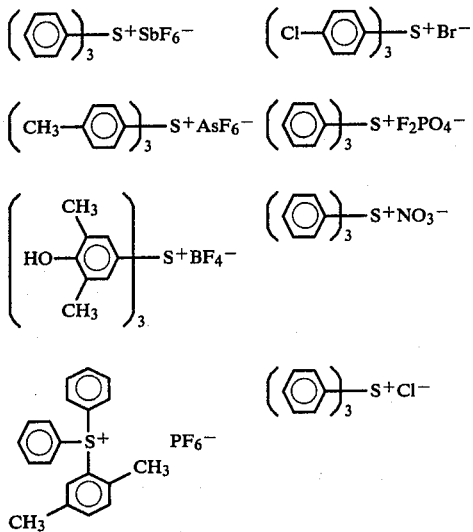

Included within the triphenylsulfonium salts of formula (2) are, for example,

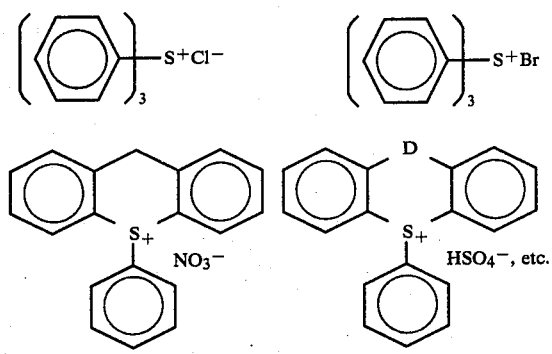

where D can be O, S, S=O, C=O, O=S=O, R—N, etc.

Among the free-radical curable compositions which can be used in the practice of the present invention are aliphatically unsaturated polyesters which can be reaction products of organic polycarboxylic acids, such as phthalic, isophthalic, adipic, glutaric, malonic, succinic, suberic, azelaic, tetrachlorophthalic, tetrahydrophthalic, chemically combined through ester linkages with one or more aliphatically unsaturated polycarboxylic acid units, such as fumaric, maleic, citraconic, itaconic, which polycarboxylic acids are reacted with glycols, such as 1,4-butanediol, 1,4-cyclohexanedimethanol, ethyleneglycol, diethyleneglycol, triethyleneglycol, etc., 1,2-propyleneglycol, isomers of dihydroxybenzene, bisphenols, such as 2,2-diphenylphenylol propane, halogenated bisphenols, etc. Experience has shown that in order to provide for effective curing results, there should be employed at least 5 mol percent to 50 mol percent of aliphatically unsaturated polycarboxylic acid units based on the total moles of polycarboxylic acid units in the polyesters. In addition, small quantities of monofunctional and polyfunctional organic acids and glycols, such as palmitic acid, pyromellitic acid, glycerin, cyclohexanol, etc., may also be incorporated in the polyester to obtain specific desirable properties. Although the molecular weight of the unsaturated polyesters can be in the range of from about 2,000 to 10,000, it is preferred that the molecular weight be in the range of from about 2,000 to 6,000. As preferred class of unsaturated polyesters is a reaction product of fumaric acid, isophthalic acid and propyleneglycol having aliphatic unsaturation within the aforementioned definition.

Vinyl aromatic organic compounds which can be employed in combination with aliphatically unsaturated polyesters include, for example, styrene, vinyltoluene and N-vinylpyrrolidone. A proportion of the vinyl aromatic compound such as styrene which can be used in combination with the unsaturated polyesters can vary widely depending upon the degree of unsaturation in the polyester as well as the viscosity of the mixture desired. It has been found, for example, that effective results can be achieved if from 0.5 mols to 10 mols of the vinyl aromatic compound are used per mole of aliphatically unsaturated polycarboxylic acid units in thepolyester. In addition to the aforementioned vinyl aromatic compounds, there also can be used in combination with the aliphatically unsaturated polyester compounds, such as methyl methacrylate, ethyl methacrylate, butylacrylate, butyl methacrylate, acrylonitrile, vinyl acetate, diethyl fumarate, dipropyl fumarate, diallylphthalate, etc. Further small amounts of polyfunctional monomers such as 1,3-butyleneglycol diarylate, polyethyleneglycol diacrylate, ethyleneglycol diarylate, etc., can be employed to enhance the cross-link density of the cured polyester.

The acrylic resins which can be used to make the photocurable compositions of the present invention include polymers and copolymers derived from esters of acrylic and methacrylic acid, such as Acryloid polymers of the Rohm and Haas Company or Elvacite resins of the DuPont Company.

Monomers shown by the above formulas which can be utilized in combination with the above organic polymers are, for example, esters of acrylic and methacrylic acids such as methyl methacrylate, butyl methacrylate, butyl acrylate, ethyl acrylate, hydroxyethyl acrylate, hydroxymethyl acrylamide, methoxyethyl acrylate, 2-ethoxyethyl methacrylate, ethylhexyl acrylate, hexadecyl acrylate or cyclohexyl acrylate. Small amounts of vinyl esters or ethers, such as vinyl acetate, vinyl propionate, or butyl vinyl ether, vinyl aromatics such as styrene, vinyl toluene, tertiary butyl styrene, or p-chlorostyrene, or other unsaturated monomers, such as diethyl fumerate, acrylonitrile, or N-vinyl-2-pyrrolidone or vinylidene chloride may also be included.

Also included in the above are multifunctional acrylate and methylacrylate monomers, such as neopentylglycol diacrylate, hexanediol diacrylate, trimethylolpropane triacrylate, pentaerythritol tetraacrylate, etc., or methacrylated oligomeric compositions, such as acrylate terminated polyesters and polyurethanes.

In addition to the above described reins, the triaryl sulfonium salts of formula (1), can be used in combination with thiol-ene resins, some of which are shown by Kerr et al U.S. Pat. Nos. 3,697,395, 3,697,396, 3,697,402, 3,700,574 and 3,661,744.

A free radical cure also can be achieved with the triarylsulfonium salts of formula (2) with oxirane containing or aliphatically unsaturated polyesters, having chemically combined oxirane oxygen in combination with vinyl aromatic compounds, or such resins with or without chemically combined oxirane oxygen with compounds such as glycidyl acrylate, glycidyl methacrylate, bisphenol-A-diglycidyl ethers, 4-vinylcyclohexane dioxide, 3,4-epoxycyclohexyl-3',4'-epoxycyclohexane carboxylate, diglycidyl phthalate, cyclohexene oxide, 1,4-butane diol diglycidyl ether, $C_4$-$C_{30}$ α-olefin oxides, epoxy-novolac resins, such as DEN 431, DEN 438, DEN 439, manufactured by the Dow Chemical Company of Midland, Michigan, etc.

In addition to the above compounds, oxirane containing polymeric materials containing terminal or pendant epoxy groups also can be blended with the acrylic resins or the unsaturated polyester compositions described above. Examples of these materials are vinyl copolymers containing glycidyl acrylate or methacrylate as one of the comonomers. Other classes of epoxy containing polymers amenable to free radical cure using the above triarylsulfonium catalysts of formula (2) are epoxy-siloxane resins, epoxy-polyurethanes and epoxy-polyesters. Such polymers usually have epoxy functional groups at the ends of their chains. Epoxy siloxane resins and method for making are more particularly shown by E. P. Plueddemann and G. Fanger, J. Am. Chem. Soc. 81 632-5 (1959). As described in the literature, epoxy resins can also be modified in a number of standard ways such as reaction with amines, carboxylic acids, thiols, phenols, alcohols, etc., as shown in U.S. Pat. Nos. 2,935,488; 3,235,620; 3,369,055; 3,379,653, 3,398,211; 3,403,199; 3,563,850; 3,567,797; 3,677,995; etc. Further examples of epoxy resins which can be used are shown in the Encyclopedia of Polymer Science and Technology, Vol. 6, 1976, Interscience Publishers, New York, pp 209-271.

In instances where the triarylsulfonium salts of formula (2) are used to effect the photocure of free-radical polymerizable materials, it has been found desirable to employ from 0 to 95 mole percent of cationic functional froups and 5 to 100 mole percent of free radical functional groups, based on the total moles of cationic functional groups and free-radical functional groups in the mixture. Free radical or cationic functionality can be present in the mixture as part of a compound, or as a polyvalent unit chemically combined without polyvalent units as part of a polymer or copolymer.

As taught in copending application of James V. Crivello, filed May 2, 1974, Ser. Nos. 466,373, 466,374, 466,375, 466,376, 466,377 and 466,378, assigned to the same assignee as the present invention, now abandoned and continuation applications of such applications, filed Dec. 9, 1975, Ser. Nos. 638,981, 638,982, 638,983, 638,993, 638,992 and 638,994, cationic polymerizable materials are provided comprising either epoxy resins or various vinyl organic and cyclic organic compounds utilizing halonium salts and onium salts of Group Va and VIa elements. More particularly, there is included, triphenylsulfonium salts included by formula (1) as a photoinitiator for epoxy resins in Ser. No. 466,374 and 638,982, and for vinyl organic compounds and cyclic compounds for Ser. No. 466,373 and 638,981. However, in accordance with the above cited teaching of copending application RD-10108 of James V. Crivello, the simultaneous free radical and cationic photocure of the mixtures utilized in the practice of the invention, provide for advantages significantly different from those provided by both the present invention, as well as those shown in the aforementioned Crivello applications.

There also can be included in the free radical curable compositions of the present invention, 100 parts of filler, per 100 parts of organic resin and other materials such as flatting agents, thixotropic agents, dyes and pigments such as barytes, blanc fixe, gypsum, calcium carbonate, quartz, diatomaceous silica, synthetic silica, clay talc, asbestos, mica, bentonite, aerogels, glass fibers, basic carbonate, white lead, anitmony oxide, lithophone, titanium dioxide, ultramarine blue, aluminum powder, etc.

Cure of the photocurable composition of the present invention can be achieved by either heating the composition at a temperature in the range of from 150° C. to 250° C., or by use of radiant energy, such as electron beam or ultraviolet light. Electron beam cure can be effected at an accelerator voltage of from about 100 to 1,000 Kv. Cure of the compositions is preferably achieved by the use of UV irradiation having a wavelength of from 1849 Å to 4000 Å and an intensity of at least 5,000–80,000 microwatts per $cm^2$. The lamp system used to generate such radiation can consist of ultraviolet lamps such as from 1 to 50 discharge lamps, for example, xenon, metallic halide, metallic arc, such as a low, medium or high pressure mercury vapor discharge lamp, etc., having an operating pressure of from a few millimeters to about 10 atmospheres, etc., can be employed. The lamps can include envelopes capable of transmitting light of a wavelength of from about 1849 Å to 4000 Å, and preferably 2400 Å to 4000 Å. The lamp envelope can consist of quartz, such as Spectrocil, or Pyrex, etc. Typical lamps which can be employed for providing ultraviolet radiation are, for example, medium pressure mercury arcs, such as the GE H3T7 arc and the Hanovia 450 W arc lamp. The cures may be carried out with a combination of various lamps, some or all of which can operate in an inert atmosphere.

In order that those skilled in the art will be better able to practice the invention, the following examples are given by way of illustration and not by way of limitation. All parts are by weight.

EXAMPLE 1

A variety of free-radical curing composition were prepared using as photoinitiators, butylbenzoin ether (Triganol 14) and triphenylsulfonium hexafluoroarsonate. The free-radical cureable organic resin included a mixture of 33% by weight styrene, and 67% by weight of an aliphatically unsaturated polyester in the form of a reaction product of isophthalic acid, fumaric acid and diethyleneglycol. Another free-radical curable organic resin consisted of equal parts by weight of methylmethacrylate and polymethylmethacrylate. A third free-radical curable organic resin employed was trimethylol propane triacrylate. The aforementioned photoinitiators were respectively employed in each of the aforementioned free-radical curable organic resins at 3% by weight. An additional series of photocurable resins were prepared employing equal molar amounts of the triphenyl sulfonium hexafluoroarsonate and the Triganol 14 photoinitiator, manufactured by the Noury Chemical Company, with the aforementioned free-radical curing organic resins.

The above photocurable mixtures were then respectively applied onto steel strips to a thickness of about 2 mils and the treated strips were passed through a curing oven utilizing G.E. H3T7 medium pressure mercury arc lamps at a distance of about 8 inches from the lamps. The following results show the conveyer speed in feet per minute required to produce a tack-free surface on the steel strip as it passed through the curing oven, where "M" indicates moles of photoinitiator.

| Resin | Conveyer Speed (ft/min) For Tack-Free Surface | | |
|---|---|---|---|
| | 3% Triganol (0.011M) | $(C_6H_5)_3S^+AsF_6^-$ (0.0066M) | $(C_6H_5)_3S^+AsF_6^-$ (0.011M) |
| 33% Styrene 67% Polyester | 60 | 35–50 | 50 |
| 50% Methylmethacrylate 50% Polymethylmethacrylate | 75 | 50 | 50 |
| Trimethylolpropane Triacrylate | 350 | 300 | 300 |

The above results show that the triphenylsulfonium salt was substantially equivalent to the Triganol 14 as a UV free-radical photoinitiator.

EXAMPLE 2

A series of blends of trimethylolpropane triacrylate with various onium salts utilized at 1% by weight, based on the weight of the blend, were prepared. The blends were applied on to glass plates to a thickness of 1.5 mil and irradiated at a distance of 6 inches from a G.E. H3T7 lamp to determine whether the particular onium salt used was capable of initiating a free radical cure. The following results were obtained, where "Yes" indicates that a tack-free film was obtained, "No" indicates that the blend remained uncured and "Cure Time" indicates length of exposure under the H3T7 lamp.

| Onium Salt | Cure Time (sec) | Cure |
|---|---|---|
| $(C_6H_5)_3S^+AsF_6^-$ | 15 | Yes |
| $(C_6H_5)_3S^+SbF_6^-$ | 15 | Yes |
| $(C_6H_5)_3S^+PF_6^-$ | 15 | Yes |
| 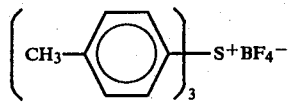 | 15 | Yes |
| 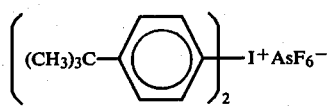 | 15 | No |
| " | 30 | No |
| | 120 | No |
|  | 60 | No |
| 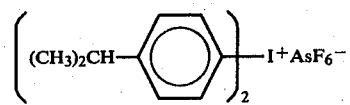 | 60 | No |
| 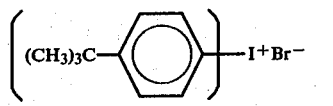 | 30 | No |
| 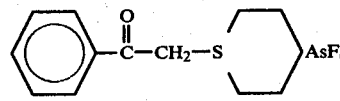 | 60 | No |
| 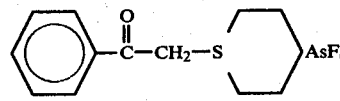 | 60 | No |
| 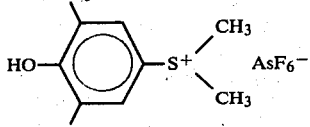 | 60 | No |
| 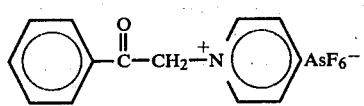 | 60 | No |

The above results show that the triarylsulfonium salt of the present invention must be employed to effect the free-radical polymerization. No cure was obtained when diphenylbenzylsulfonium fluoroborate was utilized because the methylene radical apparently interfered with the results achieved by the practice of the present invention.

EXAMPLE 3

A 1% solution of triphenylsulfonium hexafluorophosphate in hydroxypropylacrylate was irradiated in accordance with the procedure of Example 2. It was found that a polymer was obtained based on a 98% conversion of the monomer in less than 1 minute.

EXAMPLE 4

There was added 0.15 part (3%) by weight of triphenylsulfonium chloride to 5 parts of glycidyl acrylate. This mixture was spread to a thickness of 3 mils on a glass plate and irradiated for 20 seconds at a distance of 4 inches using a G.E. H3T7 mercury lamp. The mixture was observed to have polymerized. The polymer was soluble in methylene chloride and was not crosslinked. This establishes that polymerization was effected through the acrylate double bond.

EXAMPLE 5

A 1% solution of triphenylsolfonium chloride in a 1:1 mixture by weight of triallylisocyanurate and trimethylolpropane trithioglycolate was applied onto an aluminum panel as a 2 mil film. The 2 mil film was exposed to a G.E. H3T7 lamp for 15 seconds. A hard polymerized coating was obtained.

EXAMPLE 6

There was added to a mixture of 33% styrene and 67% of the unsaturated polyester of Example 1, 1% of S-phenylthioxanthilium hexafluoroarsenate of the formula

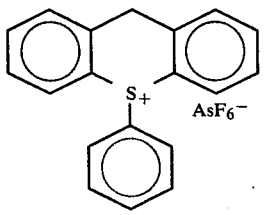

The above solution was used to impregnate one layer of a glass cloth. The impregnated cloth was then exposed to irradiation from a G.E. H3T7 lamp at a distance of four inches for 1 minute. After exposure, a rigid, cured composite was obtained.

In addition to the triarylsultonium salts of formulas (1) and (2), triarylsulfonium salts which also can be used in the practice of the invention to make photocurable compositions are compounds of the formula, $$[(R)_a(R^1)_bS]^+[Y']^- \qquad (3)$$

where R is as previously defined, $R^1$ is a divalent aromatic or divalent heterocyclic, Y' can be Y when compounds of formula (3) are used in place of compounds of formula (1) and Y' can be X when compounds of formula (3) are used in place of compounds of formula (2), "a" is 1 or 3, "b" is 0 or 1, S has a valence of 3 which can be satisfied by R alone or a combination of R and $R^1$.

Although the above examples are directed to only a few of the very many variables contained in both the practice of the method and the photocurable compositions of the present invention, it should be understood that a much broader variety of organic resins and triarylsulfonium salts can be used as shown in the description preceding these examples.

What we claim as new and desire to secure by Letters Patent of the United States is:

1. A free radical photocurable organic resin composition consisting essentially of
   (A) a free radical curable organic resin free of oxirane oxygen selected from the class consisting of acrylic resins, thiolene resins, unsaturated polyesters and a mixture of unsaturated polyester and vinyl aromatic compound,
   (B) from 0.1 to 15% by weight of a triarylsulfonium salt of the formula, $$[(R)_3S]^+[(Y)],$$

where R is a monovalent $C_{(6-13)}$ aromatic organic radical, and "Y" is an anion.

2. A composition in accordance with claim 1, where the acrylic resin is a mixture of methylmethacrylate and polymethylmethacrylate.

3. A composition in accordance with claim 1, where the triarylsulfonium salt is a triphenylsulfonium.

* * * * *